(12) United States Patent
Altuzar et al.

(10) Patent No.: US 10,565,023 B2
(45) Date of Patent: *Feb. 18, 2020

(54) OUTAGE DETECTION AND COMPUTE RESOURCE PROTECTION IN A COMPUTER SERVICE ENVIRONMENT

(71) Applicant: Microsoft Technology Licensing, LLC, Redmond, WA (US)

(72) Inventors: Sharad Cornejo Altuzar, Redmond, WA (US); Pietro Verrecchia, Seattle, WA (US); Benjamin Byrnes, Redmond, WA (US); Victoria Svidenko, Newcastle, WA (US); Donald McNamara, Woodinville, WA (US); Joseph Cusimano, Carnation, WA (US); Michael Paul Scott Bauer, Seattle, WA (US); Daniel Howard Black, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,418

(22) Filed: Nov. 6, 2018

(65) Prior Publication Data
US 2019/0073246 A1   Mar. 7, 2019

Related U.S. Application Data

(63) Continuation of application No. 15/265,501, filed on Sep. 14, 2016, now Pat. No. 10,157,083.

(51) Int. Cl.
*G06F 9/455* (2018.01)
*G06F 9/50* (2006.01)

(52) U.S. Cl.
CPC .............. *G06F 9/5083* (2013.01); *G06F 9/50* (2013.01); *G06F 9/505* (2013.01); *G06F 2209/5019* (2013.01)

(58) Field of Classification Search
CPC ........... G06F 9/5077; G06F 2209/5014; G06F 2209/5022; G06F 9/505; G06F 9/5061;
(Continued)

(56) References Cited

U.S. PATENT DOCUMENTS

| 2005/0036542 A1* | 2/2005 | Van Halen | H04N 19/503 375/240.01 |
| 2008/0104247 A1* | 5/2008 | Venkatakrishnan | G06F 9/5083 709/226 |

(Continued)

*Primary Examiner* — Dong U Kim
(74) *Attorney, Agent, or Firm* — Alleman Hall Creasman & Tuttle LLP

(57) ABSTRACT

Technologies are described for protecting compute resources during outage conditions. For example, when an outage condition is detected, currently allocated compute resources can be protected by not releasing them in response to the outage condition. For example, a load pattern representing historical usage of compute resources by a computer service can be obtained. A predicted load pattern of compute resources can be generated based on the obtained load pattern. An outage condition related to the computer service can then be detected based on the predicted load pattern. In response to detecting the outage condition, compute resources can be protected and not released in response to the outage condition.

20 Claims, 7 Drawing Sheets

(58) Field of Classification Search
CPC ............... G06F 9/5083; G06F 11/3409; G06F 11/3419; G06F 11/3466; G06F 15/161; G06F 2009/4557; G06F 2209/503
See application file for complete search history.

(56) References Cited

U.S. PATENT DOCUMENTS

| | | | | |
|---|---|---|---|---|
| 2008/0295096 A1* | 11/2008 | Beaty | ................... | G06F 9/4856 718/1 |
| 2008/0300891 A1* | 12/2008 | Boss | ................... | G06Q 10/06 705/1.1 |
| 2009/0012930 A1* | 1/2009 | Jackson | ................... | G06F 9/505 |
| 2009/0172689 A1* | 7/2009 | Bobak | ................... | G06F 9/5061 718/104 |
| 2010/0088205 A1* | 4/2010 | Robertson | ............ | G06Q 20/102 705/34 |
| 2010/0131324 A1* | 5/2010 | Ferris | ................... | G06Q 10/06 705/7.12 |
| 2011/0185064 A1* | 7/2011 | Head | ................... | G06F 9/5077 709/226 |
| 2011/0235592 A1* | 9/2011 | Hoefel | ................... | H04L 67/42 370/329 |
| 2011/0264805 A1* | 10/2011 | Breitgand | ........... | G06F 9/45558 709/226 |
| 2012/0179824 A1* | 7/2012 | Jackson | ................ | G06F 9/5027 709/226 |
| 2014/0149986 A1* | 5/2014 | S M | ................... | G06F 9/5083 718/1 |
| 2014/0280972 A1* | 9/2014 | Calippe | ............... | H04L 67/1012 709/226 |
| 2015/0281110 A1* | 10/2015 | Chow | ................... | H04L 47/70 709/226 |
| 2016/0013992 A1* | 1/2016 | Reddy | ................... | H04L 67/38 709/224 |

\* cited by examiner

Figure 3
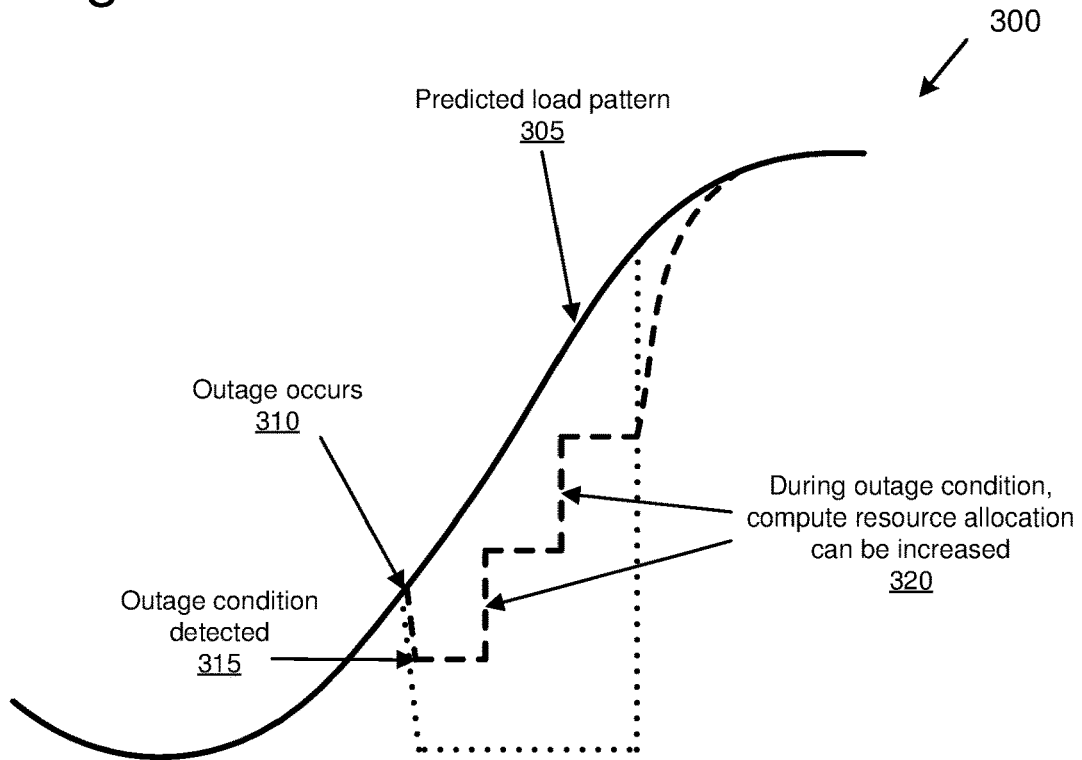
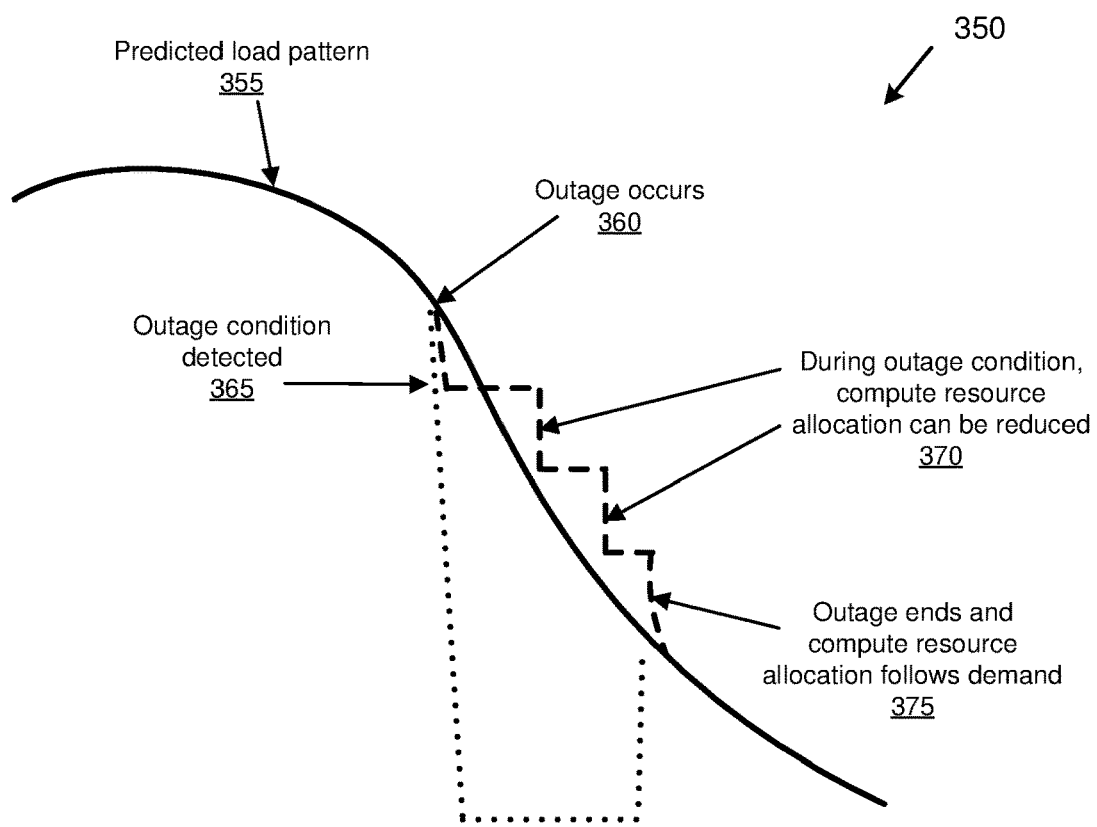

OUTAGE DETECTION AND COMPUTE RESOURCE PROTECTION IN A COMPUTER SERVICE ENVIRONMENT

CROSS REFERENCE TO RELATED APPLICATIONS

This application is a continuation of U.S. patent application Ser. No. 15/265,501, filed Sep. 14, 2016, which is hereby incorporated by reference.

BACKGROUND

It is important for computer service environments to have sufficient compute resources to service user needs. For example, a computer service that operates using cloud compute resources can scale the amount of allocated cloud compute resources up or down as demand for the computer service increases or decreases over time.

However, problems can occur when allocated compute resources cannot keep up with demand. For example, when compute resources are allocated in cloud computing environments for dynamically scaling workloads, such as gaming, those resources are often released when not in active use. In such an environment, there are typically dependencies on one or more network connected services. When these dependent services go down or network connectivity is lost, the resources are released and load can return very quickly once the connectivity is restored or the outage is resolved. The remaining resources can no longer sustain the load and the outage is perceived to last longer by the end user. In addition, new resources may not be allocated fast enough to meet the quickly increasing demand.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for protecting compute resources during outage conditions. For example, when an outage condition is detected, compute resources can be protected by not releasing them in response to the outage condition. In some implementations, outages are detected using a predicted load pattern (e.g., by comparing currently allocated compute resources to the predicted load pattern).

For example, a load pattern representing historical usage of compute resources by a computer service can be obtained. A predicted load pattern of compute resources can be generated based on the obtained load pattern. An outage condition related to the computer service can then be detected based on the predicted load pattern. For example, when currently allocated compute resources fall below the predicted load pattern by more than a threshold amount, an outage condition can be detected. In response to detecting the outage condition, compute resources can be protected and not released in response to the outage condition.

BRIEF DESCRIPTION OF THE DRAWINGS

FIG. 3 is a diagram depicting example outage scenarios in which compute resources can be increased, and decreased, during the outage condition.

DETAILED DESCRIPTION

Overview

Figure 1:
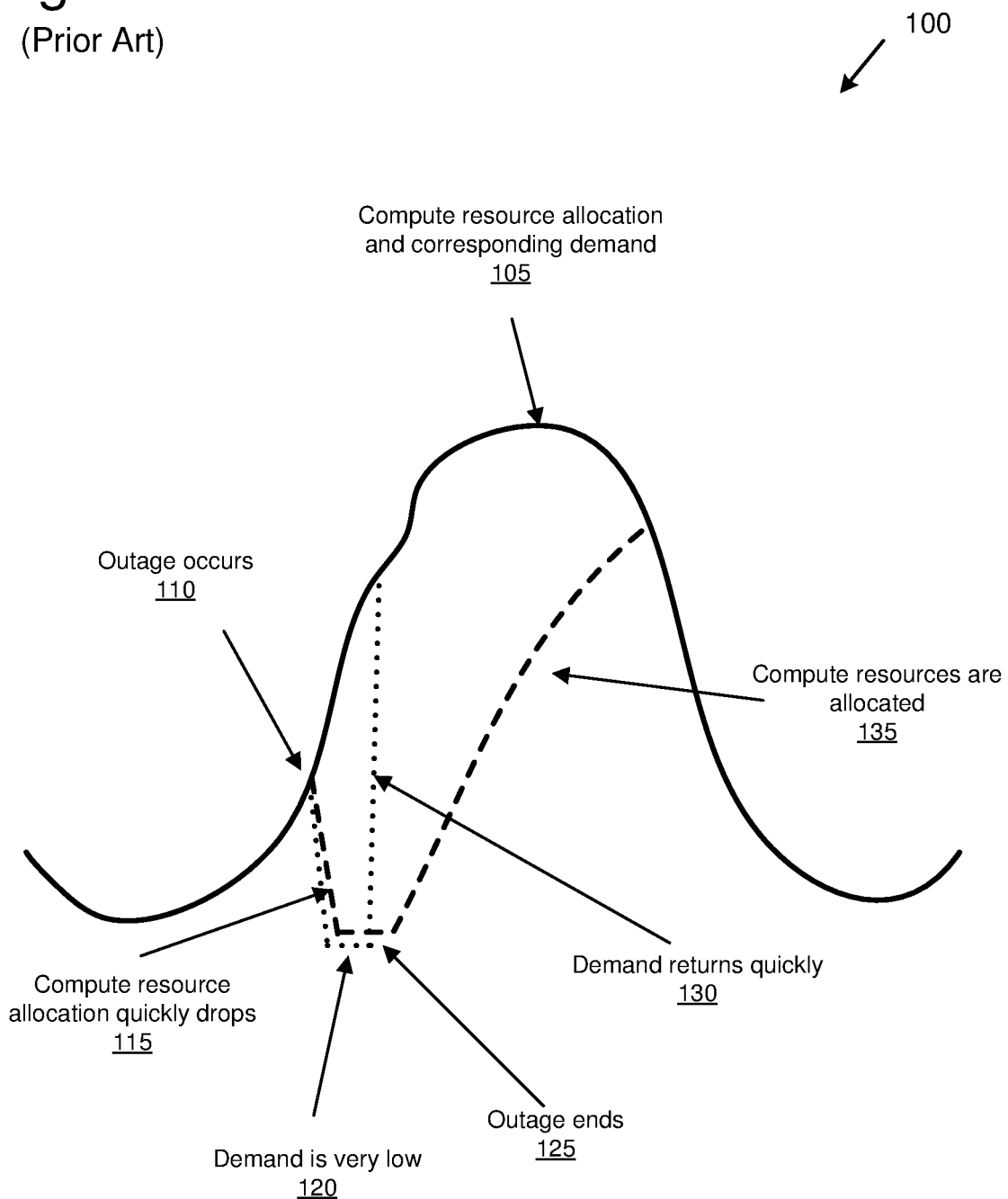
FIG. 1 is a diagram depicting an example prior art outage scenario.

Various technologies are described for protecting compute resources during outage conditions. In some implementations, when an outage condition is detected, compute resources are protected from the outage condition by not releasing them. For example, a typical response to an outage condition can be to release compute resources (e.g., virtual machines running in a cloud environment, networking resources, storage resources, processor and memory resources, database resources, and/or other types of compute resources). Instead of releasing allocated compute resources in response to an outage condition, the technologies described herein can be used to protect the allocated compute resources. Protecting the allocated compute resources from the outage condition (e.g., not releasing them) can improve the speed of recovery, and reduce or eliminate service disruptions, when the outage condition ends.

For example, compute resources can be protected in an environment that operates pools of compute resources (e.g., virtual machines) for online video games (e.g., persistent gaming worlds, multi-player game sessions, etc.) or other types of computer services (e.g., chat applications, rendering sessions, etc.). The utilization of compute resources (also called load) can be monitored to detect anomalies caused by outages (e.g., network or dependent service outages) that interfere with demand for the computer service. Instead of taking a typical action of releasing compute resources (e.g., destroying virtual machines), the compute resources can be maintained in order to reduce or eliminate disruption caused when the outage is resolved and demand quickly returns. In addition, the technologies for protecting compute resources during outages can be performed in an automated fashion and without user intervention. For example, the monitoring for outages, and the action taken in response to the outages (e.g., not releasing compute resources), can be performed automatically and in real-time or near-real-time without user intervention.

In some implementations, outage conditions are detected based at least in part upon predicted load patterns. Predicted load patterns can be generated from load patterns representing historical usage of compute resources. For example, a load pattern representing historical usage of compute resources can be obtained (e.g., for a specific computer service located in a specific geographical location, such as a continent, country, or data canter). The load pattern representing historical usage of compute resources can comprise load data (e.g., quantity of compute resources utilized and/or allocated to the computer service over a period of time). The load data can cover a period of time, such as a number of days, weeks, or months, which can be controlled by a configurable setting. For example, a load pattern can be obtained representing historical usage of compute resources for a specific online video game operating in the North America region for a 7-day period. The load data can be processed using various data collection and processing techniques. For example, the load data can be averaged on a periodic basis (e.g., hourly) for use in generating the load pattern representing historical usage. Various settings related to the collection and processing techniques can be user-configurable. For example, a user configurable resolution setting can be provided to control the time period over which the historical data is averaged (e.g., a configurable number of minutes or hours).

Using the historical load pattern, a predicted load pattern of compute resources can be generated. For example, a predictable pattern can be identified in the historical load pattern and used to generate the predicted load pattern. In some implementations, usage of compute resources by the computer service follows a cyclical pattern (e.g., a pattern that repeats on a daily basis). Using a historical load pattern generated from a number of days of historical load data (e.g., a previous week of historical load data), a predicted load pattern can be generated for a future time period (e.g., one or more future days).

Generation of the predicted load pattern can be performed using a variety of predictive techniques. In some implementations, the predicted load pattern is generated using, at least in part, an exponential smoothing technique. In some implementations, the predicted load pattern is generated using, at least in part, an auto-regressive integrated moving average (ARIMA) technique. In some implementations, other predictive techniques (e.g., regression techniques, time series techniques, or other techniques) can be used alone or in combination to generate the predicted load pattern. In an example implementation, the predicted load pattern is generated using the R statistical computing environment (www.r-project.org) and the R forecast package (cran.r-project.org/web/packages/forecast/index.html).

Predicted load patterns can also be generated in other ways. For example, predicted load patterns can be generated using techniques that do not rely on, or only partially rely on, historical load data. In some implementations, historical load data is used in combination with previous predicted load data to create the historical load pattern. For example, historical load data may have time periods of anomalous data (e.g., time periods where an outage happened in the past and if used could interfere with the accuracy of the prediction). These time periods of anomalous data can be replaced with previous predicted load data so that the historical load data, in combination with the previous predicted load data, can be used to generate the predicted load pattern which can result in a more accurate prediction.

An outage condition refers to a problem that results in a drop in demand for the computer service. An outage condition can be caused by networking problems (e.g., a network failure that prevents users from connecting to the computer service), dependent service problems (e.g., a problem with a login or authentication service that drops users and/or prevents users from accessing the computer service), or other software or hardware issues that result in users having trouble connecting to or utilizing the computer service. One example of a dependent service is a matchmaking service for a multi-player online game. If the matchmaking service goes down (e.g., hardware or software failure, network problem, etc.), then players may not be able to join the online game and it will appear to the compute resources and systems managing the load for the online game that there are fewer players, or no players, wanting to play the online game.

Using the predicted load pattern and current compute resource utilization, an outage condition can be detected. For example, an outage condition can be detected when the currently allocated compute resources (which correspond to the current utilization, or load, of the computer service) deviate from the predicted load pattern. In some implementations, an outage condition is detected when the currently allocated compute resources fall below the predicted load pattern by more than a threshold amount. As an example, if the currently allocated compute resources fall a threshold amount below the predicted load pattern (e.g., fall a threshold percentage, such as 20%, below the predicted load pattern), then an outage condition can be detected. Stated another way, if the currently allocated compute resources are reduced to a threshold percentage of the predicted load pattern (e.g., 80%), then an outage condition can be detected. The threshold amount (also called a threshold delta) can be a configurable amount (e.g., a configurable percentage). The threshold amount can also be specific to the computer service and/or region. For example, each specific service and region can have an independently configurable threshold amount, which can take into account the specific pattern and variation seen in the specific service and region.

When an outage condition is detected, compute resources can be protected. Protection of compute resources can include not releasing currently allocated compute resources in response to the outage condition. For example, when an outage condition occurs, a typical response can be to release allocated compute resources due to the quickly falling demand. Instead of releasing the allocated compute resources, the allocated compute resources can be retained so that they are ready when the outage condition ends and demand increases.

In typical cloud computing environments supporting dynamically scaling workloads (e.g., an online gaming computer service or a service supporting another type of application with a cyclical usage pattern), compute resources are released when not in active use. For example, when demand drops or is reduced, cloud compute resources are released (also referred to as reduced or destroyed), and when demand increases, cloud compute resources are added (also referred to as allocated or created). Such a solution can work well when variations in demand are gradual over time. However, when demand increases quickly, allocation of additional compute resources may not be able to keep up. For example, allocating new compute resources (which may require software installation and/or configuration) can take a significant amount of time (e.g., a number of minutes or hours). Due to this issue, service interruptions can be particularly severe during, and following, outages. For example, if a network outage occurs and demand drops quickly (e.g., to a very low level or to zero), then currently allocated compute resources may be reduced to a corresponding low level. After the outage is resolved and demand quickly increases, it can take a significant amount of time (e.g., hours) for allocation of compute resources to catch up with demand. During this time period, service may be unavailable or interrupted for users of the service.

Instead of allowing compute resources to be reduced when demand drops due to an outage, the technologies described herein protect the compute resources. Therefore, once the outage is resolved, the compute resources are in place and ready to take on the load. This results in a quicker recovery process and users of the service experience less downtime and service interruption. For example, using previous solutions, recovery from an outage may cause service interruption for a long period of time (e.g., hours) after the outage is resolved. Using the technologies described herein that protect the compute resources, recovery from an outage may take significantly less time (e.g., minutes) after the outage is resolved.

Example Outage Scenarios

In the technologies described herein, compute resources can be protected during an outage condition. For example, a computer service operating in a cloud computing environment (e.g., that uses allocated compute resources, such as virtual machines, to operate the computer service for use by users) may experience an outage that affects the ability of users to utilize the computer service. As a result of the outage, compute resources currently allocated to the computer service may be released due to the falling demand. Instead of releasing the compute resources, the allocated compute resources can be protected (e.g., at least a portion of the compute resources can be maintained and not released in response to the outage).

FIG. 1 is a diagram 100 depicting an example prior art outage scenario. In the diagram 100, a curve 105 is displayed. The curve 105 represents compute resource allocation (and corresponding load or demand) as it would have been if an outage had not occurred. The curve 105 also represents a cyclical pattern of compute resource usage (e.g., over a period of about one day). For example, in the context of an online video game, demand may be at its lowest during the night (e.g., late at night or early in the morning) and increase to its highest during the day (e.g., afternoon or evening).

The diagram 100 illustrates a prior art scenario in which compute resources are released in response to an outage condition. As depicted at 110, an outage occurs and actual demand (the dotted line) drops quickly. In response to the drop in demand, compute resource allocation (the dashed line) also drops quickly, as depicted at 115. During the outage, demand is very low (e.g., at or near zero), as depicted at 120. The compute resource allocation also drops to a very low level corresponding with the low demand (e.g., most or all of the compute resources utilized by the computer service are released).

After some period of time (e.g., after a number of minutes or an hour), the outage ends, as depicted at 125. After the outage ends, demand returns quickly, as depicted at 130, to the expected level (reflected by the curve 105). In response to the increasing demand (depicted at 130), additional compute resources are allocated, as depicted at 135. However, because it can take a significant amount of time to allocate new compute resources, the compute resources cannot keep up with the demand, which results in an extended outage condition during which the computer service may not be available and/or the computer service may experience disruption or intermittent outage for some or all users.

Figure 2:
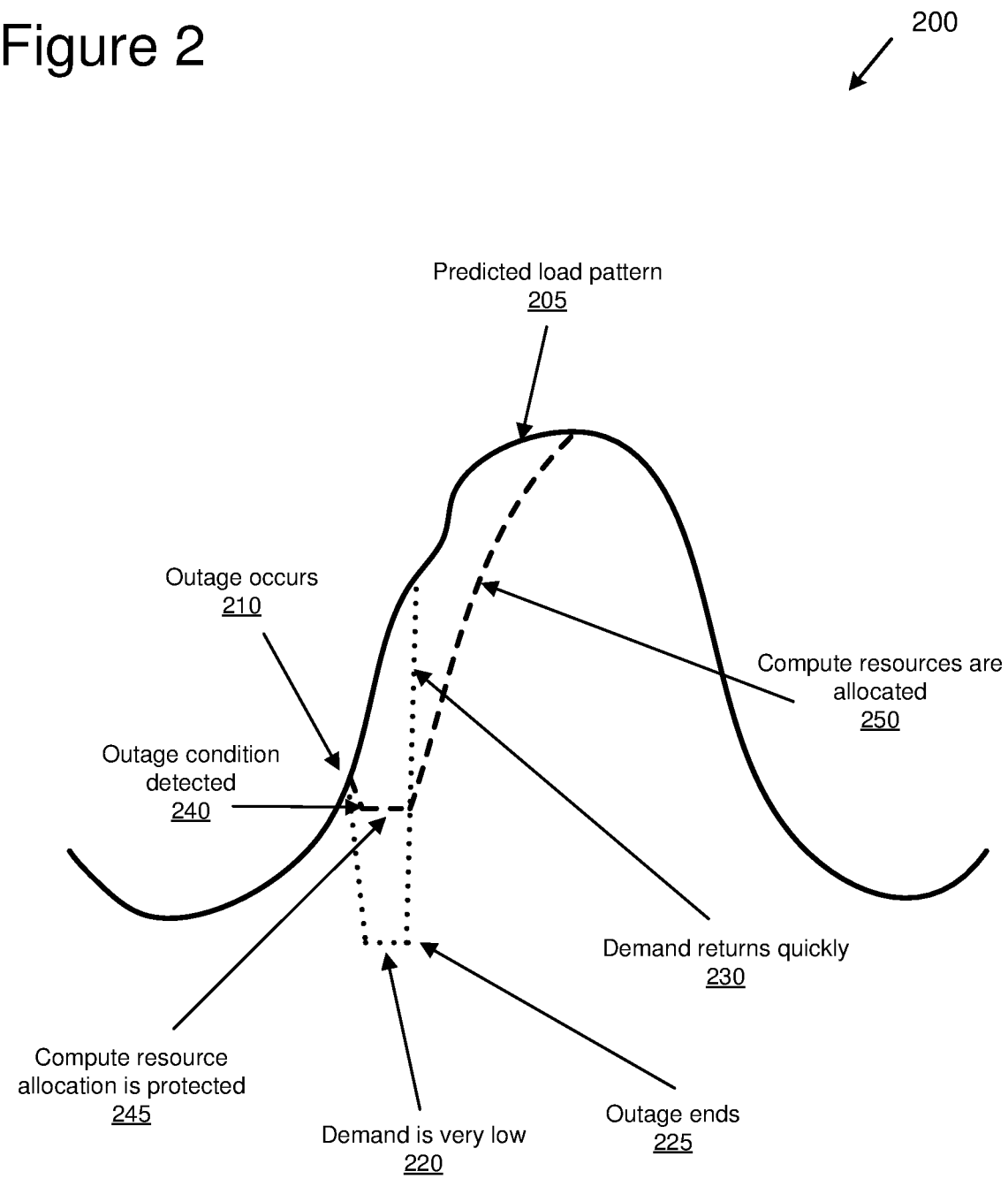
FIG. 2 is a diagram depicting an example outage scenario and recovery process in which compute resources are protected.

FIG. 2 is a diagram 200 depicting an example outage scenario and recovery process in which compute resources are protected. In the diagram 200, a curve 205 is displayed. The curve 205 is a predicted load pattern representing predicted usage of compute resources by a specific computer service. In order to provide a contrast to the diagram 100, the curve 205 has a shape corresponding to the curve 105.

The diagram 200 illustrates a scenario in which compute resources are protected in response to an outage condition. As depicted at 210, an outage occurs and actual demand (the dotted line) drops quickly. As depicted at 240, the outage condition is detected. For example, the outage condition can be detected when the currently allocated compute resources (the dashed line) falls more than a threshold amount (e.g., more than 20%, or by a different configurable amount) below the predicted load pattern curve 205. Upon detecting the outage condition, as depicted at 240, currently allocated compute resources are protected, as depicted at 245. For example, the compute resources that are allocated when the outage condition is detected can be protected from being released (e.g., as would otherwise happen in response to the falling demand) As depicted at 220, demand falls significantly during the outage, while allocated compute resources are protected from being released, as depicted at 245.

After some period of time (e.g., after a number of minutes or an hour), the outage ends, as depicted at 225. After the outage ends, demand returns quickly, as depicted at 230, to the expected level (reflected by the predicted load pattern curve 205). In response to the actual demand increasing (depicted at 230), additional compute resources are allocated, as depicted at 250. Because the compute resources were protected from being released (as depicted at 245), additional compute resources can be allocated beginning from a much higher level as compared to the scenario depicted in FIG. 1. Therefore, the compute resources are able to catch up to the increasing demand much more quickly, which results in a significantly shorter period during which users may experience disruption of the computer service.

In some implementations, currently allocated compute resources can be increased and/or decreased during an outage condition. FIG. 3 is a diagram depicting example outage scenarios in which compute resources can be increased, and decreased, during the outage condition.

At 300, an example scenario is depicted in which compute resources are increased (e.g., step-up). At 300, a predicted load pattern curve 305 is displayed representing an increasing period of compute resource utilization (e.g., part of a daily cycle). As depicted at 310, an outage occurs and demand (the dotted line) drops quickly. The outage condition is detected, as depicted at 315. When the outage condition is detected, the compute resources (the dashed line) are protected from being released. Instead of maintaining the compute resources allocated when the outage condition is detected (as depicted at 315) for the entire outage period, the implementation depicted at 300 allows new compute resources to be allocated during the outage period, as depicted at 320. For example, when the predicted load pattern 305 is greater than the currently allocated compute resources (e.g., greater than the allocated compute resources by a configurable amount), new compute resources can be allocated (e.g., monitored and allocated on a periodic basis, which can be a configurable setting). For example, the new compute resources can be allocated using a step-up process where an amount of new compute resources are allocated on a periodic basis to more closely match the predicted load pattern 305. When the outage ends and demand increases, compute resources are allocated as previously described (e.g., as depicted at 230 and 250 in relation to FIG. 2). This procedure can provide benefits by reducing the time needed (and the amount of service interruption experienced by users) to recover after the outage is resolved.

At 350, an example scenario is depicted in which compute resources are decreased (e.g., step-down). At 350, a predicted load pattern curve 355 is displayed representing a decreasing period of compute resource utilization (e.g., part of a daily cycle). As depicted at 360, an outage occurs and demand (the dotted line) drops quickly. The outage condition is detected, as depicted at 365. When the outage condition is detected, the compute resources (the dashed line) are protected, at least for an initial period of time, from being released. Instead of maintaining the compute resources allocated when the outage condition is detected (as depicted at 365) for the entire outage period, the implementation depicted at 350 allows at least a portion of the currently allocated compute resources to be released during the outage period, as depicted at 370. For example, when the predicted load pattern 355 is less than the currently allocated compute resources (e.g., less than the allocated compute resources by a configurable amount), a portion of the currently allocated compute resources can be released (e.g., monitored and released on a periodic basis, which can be a configurable setting). For example, currently allocated compute resources can be released using a step-down process where a portion of the currently allocated compute resources are released on a periodic basis to more closely match the predicted load pattern 355. This procedure can provide benefits in terms of cost savings and efficient utilization of compute resources (e.g., compute resources do not need to be maintained if the load expected when the outage is resolved is lower than when the outage occurred).

Example Methods for Protecting Compute Resources during Outage Conditions

In the technologies described herein, compute resources utilized by computer services can be protected during outage conditions. For example, compute resource can be maintained (e.g., not released) in response to the outage (e.g., at least for a period of time).

Figure 4:
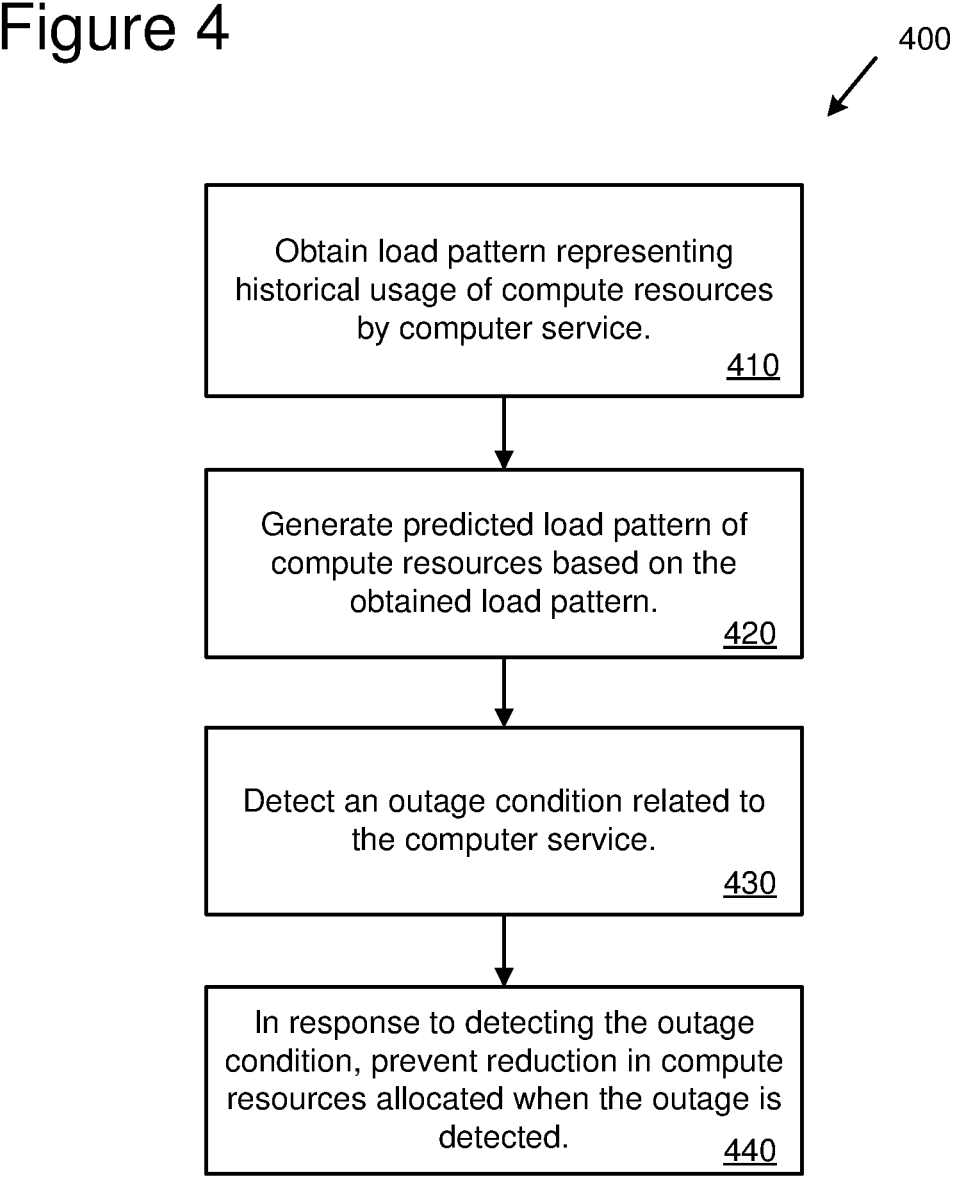
FIG. 4 is a diagram depicting an example method for protecting compute resources during outage conditions.

FIG. 4 is a flowchart of an example method 400 for protecting compute resources during outage conditions. At 410, a load pattern is obtained representing historical usage of compute resources by a computer service. For example, the load pattern can represent a cyclical pattern (a daily pattern) for a specific computer service for a specific geographical region.

At 420, a predicted load pattern of compute resources is generated based on the obtained load pattern. For example, an exponential smoothing technique can be used to generate the predicted load pattern alone or in combination with other prediction techniques.

At 430, an outage condition related to the computer service is detected. The outage condition results in a reduction in demand for the computer service (e.g., users may be disconnected and/or unable to connect to the computer service). The outage condition can be detected in real-time or near-real-time (e.g., by monitoring on a second, or sub-second, basis).

At 440, in response to detecting the outage condition, reduction in compute resources allocated when the outage is detected is prevented. Therefore, the compute resources that are currently allocated when the outage is detected are not released in response to the outage condition. However, in some implementations, the currently allocated compute resources can be increased and/or decreased at a later time during the outage condition (e.g., as part of a step-up or step-down procedure).

Figure 5:
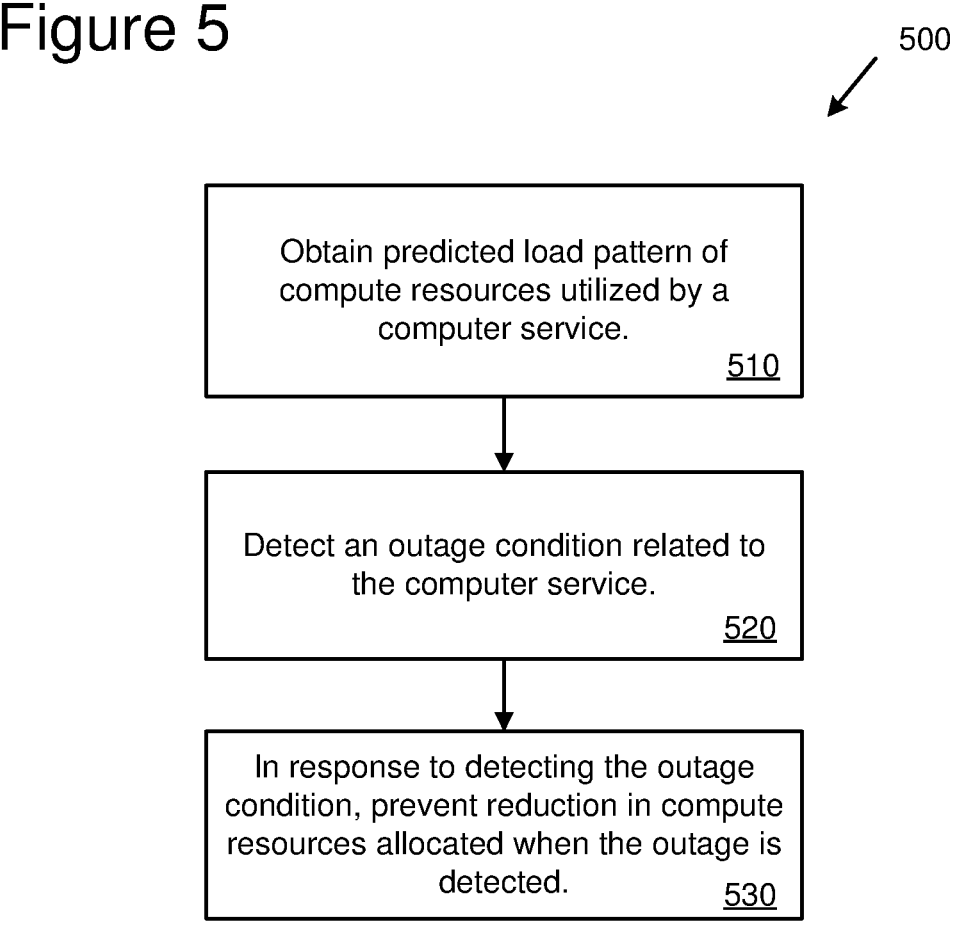
FIG. 5 is a diagram depicting an example method for protecting compute resources during outage conditions using a predicted load pattern.

FIG. 5 is a diagram depicting an example method 500 for protecting compute resources during outage conditions using predicted load patterns. At 510, a predicted load pattern is obtained representing compute resources to be utilized by a computer service. For example, the predicted load pattern can be generated from historical load data for the computer service.

At 520, an outage condition related to the computer service is detected. The outage condition results in a reduction in demand for the computer service (e.g., users may be disconnected and/or unable to connect to the computer service). The outage condition can be detected in real-time or near-real-time (e.g., by monitoring on a second, or sub-second, basis).

At 530, in response to detecting the outage condition, reduction in compute resources allocated when the outage is detected is prevented. Therefore, the compute resources that are currently allocated when the outage is detected are not released in response to the outage condition. However, in some implementations, the currently allocated compute resources can be increased and/or decreased at a later time during the outage condition (e.g., as part of a step-up or step-down procedure.

Figure 6:
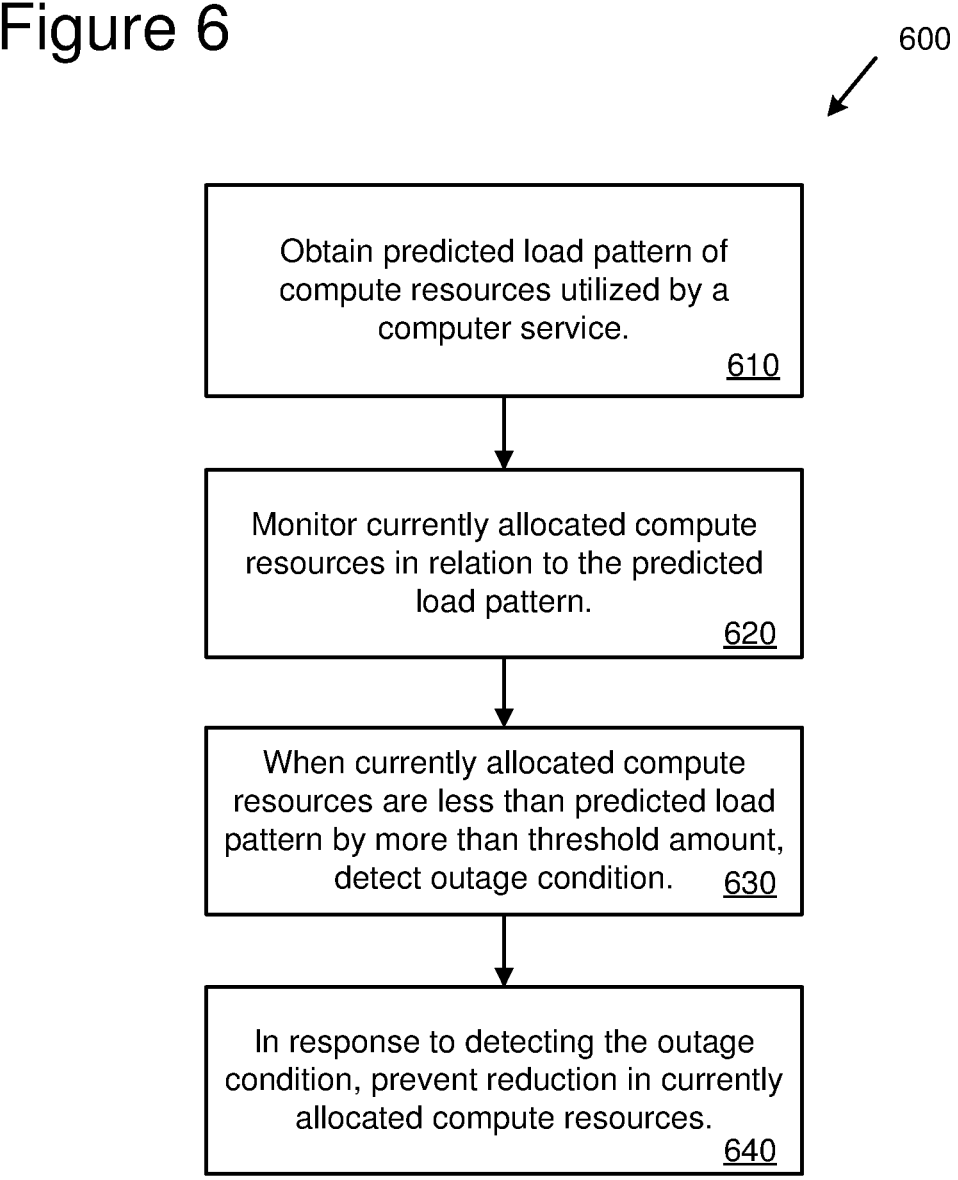
FIG. 6 is a diagram depicting an example method for protecting compute resources during outage conditions using a predicted load pattern and monitoring currently allocated compute resources.

FIG. 6 is a diagram depicting an example method 600 for protecting compute resources during outage conditions using a predicted load pattern and monitoring currently allocated compute resources. At 610, a predicted load pattern is obtained representing compute resources to be utilized by a computer service. For example, the predicted load pattern can be generated from historical load data for the computer service.

At 620, currently allocated compute resources are monitored in relation to the predicted load pattern. For example, the monitoring can be performed in real-time or near-real-time (e.g., by monitoring once per second or multiple times per second).

At 630, when currently allocated compute resources are less than the predicted load pattern by more than a threshold amount, an outage condition is detected. Using the predicted load pattern (obtained at 610) and in response to the monitoring (performed at 620), outage conditions can be detected on a real-time or near-real-time basis. For example, if the load of a computer service falls below the predicted load pattern by more than a threshold amount (e.g., falls more than 20 percent from the predicted load pattern, or falls by a different configurable amount), then an outage condition can be detected.

At 640, in response to detecting the outage condition, reduction in currently allocated resources (e.g., those compute resources that are allocated when the outage is detected) is prevented. However, in some implementations, the currently allocated compute resources can be increased and/or decreased at a later time during the outage condition (e.g., as part of a step-up or step-down procedure.

In some implementations, a predicted load pattern is not used in detecting an outage condition. For example, an indication of an outage can be received from a monitoring or reporting system. For example, a network or dependent service monitoring system can indicate that an outage has occurred. In response to the indication of the outage, compute resources can be protected using the various technologies described herein.

Computing Systems

Figure 7:
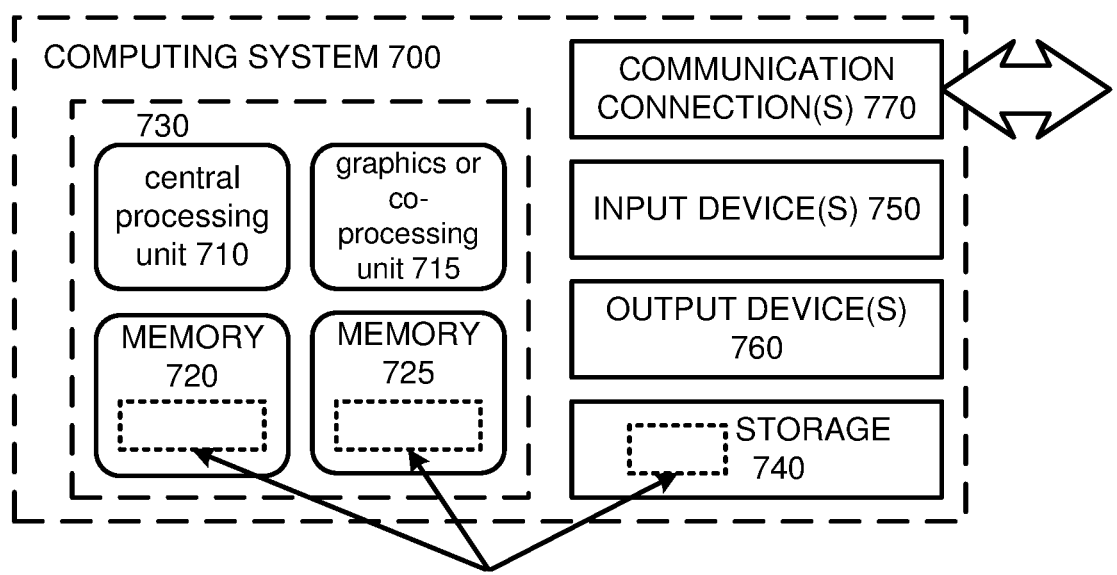
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine," "use," "detect," "prevent," and others, to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, including 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the computing device configured to perform operations for protecting compute resources during outage conditions, the operations comprising:
obtaining a load pattern representing, at least in part, historical usage of compute resources by a computer service;
based on the load pattern representing historical usage, generating a predicted load pattern of compute resources to be utilized by the computer service;
detecting an outage condition related to the computer service as it occurs, wherein the outage condition results in a reduction of demand for the computer service, wherein the outage condition is caused by a source external to the compute resources that results in users being unable to connect to or utilize the computer service, and wherein the outage condition is detected when currently allocated compute resources fall below the predicted load pattern by more than a threshold amount; and
in response to detecting the outage condition, preventing reduction in compute resources allocated when the outage condition is detected, wherein the compute resources allocated when the outage condition is detected are not released in response to the reduction in demand due to the outage condition.

2. The computing device of claim 1 wherein detecting the outage condition comprises:
monitoring currently allocated compute resources in relation to the predicted load pattern.

3. The computing device of claim 1 wherein the predicted load pattern is generated using predictive techniques comprising an exponential smoothing technique.

4. The computing device of claim 1, the operations further comprising:
when demand for the computer service returns to a level of the compute resources allocated when the outage condition is detected, allocating new compute resources corresponding to increasing demand for the computer service.

5. The computing device of claim 1 wherein the load pattern representing historical usage and the predicted load pattern follow a cyclical pattern.

6. The computing device of claim 1 wherein the computer service is an online video game, and wherein the compute resources comprise virtual machine resources allocated within a cloud computing environment.

7. The computing device of claim 1, the operations further comprising:
during the outage condition and when the predicted load pattern is above the compute resources allocated when the outage condition is detected, performing a step-up operation by allocating additional compute resources to the compute resources allocated when the outage condition is detected.

8. The computing device of claim 1 wherein the obtained load pattern comprises previous predicted load data corresponding to one or more previous outage conditions.

9. A method for protecting compute resources during outage conditions, the method comprising:
obtaining a predicted load pattern of compute resources to be utilized by a computer service, wherein the predicted load pattern is generated based, at least in part, on historical usage of compute resources by the computer service;
detecting an outage condition related to the computer service as it occurs, wherein the outage condition results in a reduction of demand for the computer service, wherein the outage condition is caused by a source external to the compute resources that results in users being unable to connect to or utilize the computer service, and wherein the outage condition is detected when currently allocated compute resources fall below the predicted load pattern by more than a threshold amount; and
in response to detecting the outage condition, preventing reduction in compute resources allocated when the outage condition is detected while the predicted load pattern remains above the compute resources allocated when the outage condition is detected.

10. The method of claim 9, further comprising:
during the outage condition, allowing reduction in compute resources allocated when the outage condition is detected if the predicted load pattern drops below the compute resources allocated when the outage condition is detected.

11. The method of claim 10, further comprising:
when the predicted load pattern drops below the compute resources allocated when the outage condition is detected, performing a step-down operation by releasing a portion of the compute resources allocated when the outage condition is detected.

12. The method of claim 9, further comprising:
during the outage condition and when the predicted load pattern is above the compute resources allocated when the outage condition is detected, performing a step-up operation by allocating additional compute resources to the compute resources allocated when the outage condition is detected.

13. The method of claim 9, wherein detecting the outage condition comprises:
monitoring currently allocated compute resources in relation to the predicted load pattern.

14. A method for protecting compute resources during outage conditions, the method comprising:
obtaining a predicted load pattern of compute resources to be utilized by a computer service, wherein the predicted load pattern is generated based, at least in part, on historical usage of compute resources by the computer service;
monitoring currently allocated compute resources in relation to the predicted load pattern; and
when the currently allocated compute resources are less than the predicted load pattern by more than a threshold amount, detecting that an outage condition exists, wherein the outage condition results in a reduction of demand for the computer service, and wherein the outage condition is caused by a source external to the compute resources that results in users being unable to connect to or utilize the computer service; and
in response to detecting the outage condition, preventing reduction in the currently allocated compute resources.

15. The method of claim 14, wherein the computer service is an online video game supporting remote users, wherein the compute resources comprise virtual machine resources allocated within a cloud computing environment, and wherein the predicted load pattern is a cyclical pattern.

16. The method of claim 14, the operations further comprising:
when demand for the computer service returns to a level of the currently allocated compute resources, allocating new compute resources corresponding to increasing demand for the computer service.

17. The method of claim 14 further comprising:
when the predicted load pattern drops below the currently allocated compute resources, releasing a portion of the currently allocated compute resources.

18. The method of claim 14 wherein the outage condition is caused by one or both of a network problem or a dependent service problem.

19. The method of claim 14, further comprising:
during the outage condition and when the predicted load pattern is above the compute resources allocated when the outage condition is detected, performing a step-up operation by allocating additional compute resources to the compute resources allocated when the outage condition is detected.

20. The method of claim 14 wherein the obtained load pattern comprises previous predicted load data corresponding to one or more previous outage conditions.

* * * * *